(No Model.)  3 Sheets—Sheet 1.

E. A. TRAPP.
DUMP CAR.

No. 571,058. Patented Nov. 10, 1896.

WITNESSES:
D. N. Hayward
Jacob Newman

INVENTOR
Edward A. Trapp
BY A. Parker Smith
his ATTORNEY

THE NORRIS PETERS CO., PHOTO-LITHO., WASHINGTON, D. C.

(No Model.)　　　　　　　　　　　　　　3 Sheets—Sheet 2.

E. A. TRAPP.
DUMP CAR.

No. 571,058.　　　　　　　　　Patented Nov. 10, 1896.

WITNESSES:　　　　　　　　　　　　　　　INVENTOR
D. H. Hayword　　　　　　　　　　　　　Edward A. Trapp
Jacob Newman　　　　　　　　　　　　　BY A. Parker Smith
　　　　　　　　　　　　　　　　　　　　　his ATTORNEY (No Model.) 3 Sheets—Sheet 3.
E. A. TRAPP.
DUMP CAR.
No. 571,058. Patented Nov. 10, 1896.
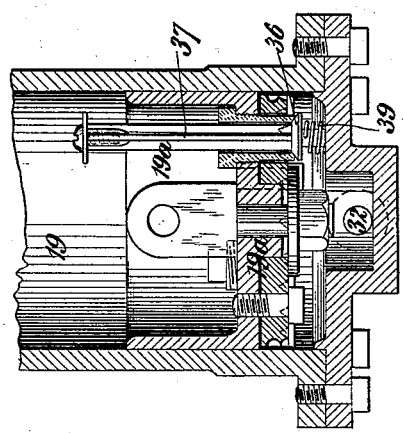
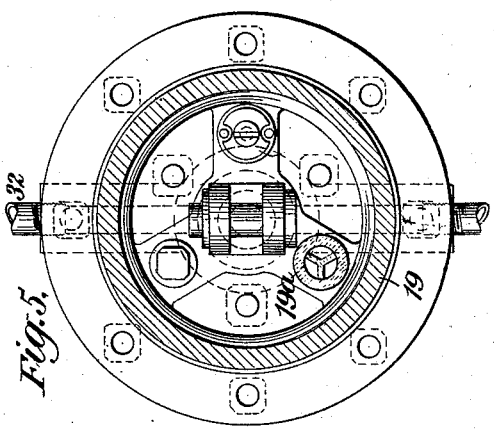
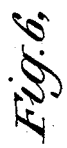
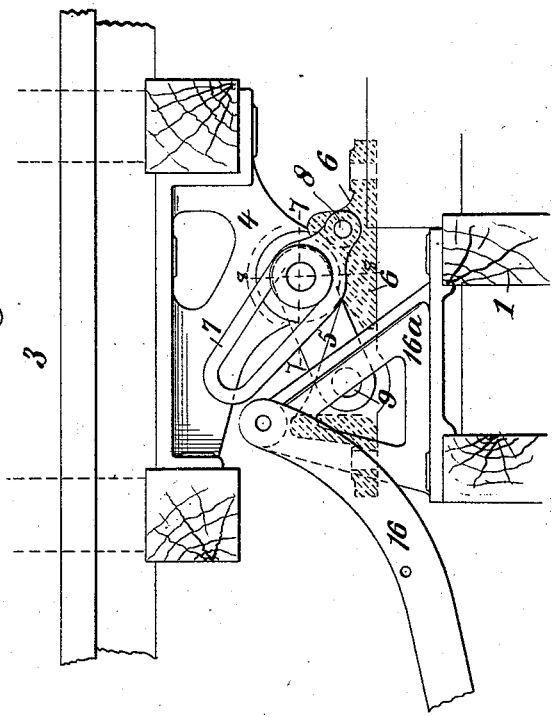
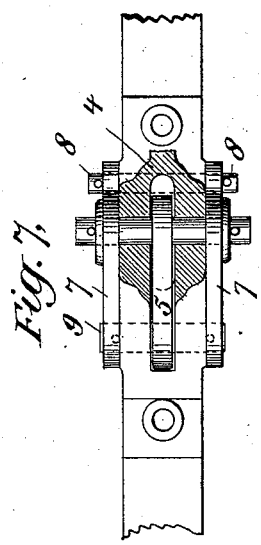
WITNESSES:
D. H. Hayford
Jacob Newman
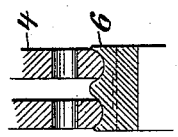
INVENTOR
Edward A. Trapp
BY R. Parker Smith
his ATTORNEY
THE NORRIS PETERS CO., PHOTO-LITHO., WASHINGTON, D. C.

UNITED STATES PATENT OFFICE.

EDWARD A. TRAPP, OF NEW YORK, N. Y.

DUMP-CAR.

SPECIFICATION forming part of Letters Patent No. 571,058, dated November 10, 1896.

Application filed February 19, 1896. Serial No. 579,877. (No model.)

*To all whom it may concern:*

Be it known that I, EDWARD A. TRAPP, a citizen of the United States, residing at New York, in the county of New York and State of New York, have invented certain new and useful Improvements in Dump-Cars; and I do hereby declare the following to be a full, clear, and exact description of the invention, such as will enable others skilled in the art to which it appertains to make and use the same.

My invention relates to dumping-cars, and while applicable to various kinds of dumping-cars is specially designed for use in automatic dumping-cars which may be operated to dump and return to the horizontal position by steam or air pressure under the control of the engineer in the locomotive-cab.

Heretofore various kinds of apparatus have been employed for accomplishing this purpose, the principle of operation of which has been the tipping up of the loaded car-body by compressed-air apparatus and its return to the horizontal position by reverse action of the apparatus or by gravity alone. The disadvantages of this construction are many. Among them I may mention the large consumption of power necessary to move the loaded car-body, the unstable equilibrium of the car-body on curves and other trying parts of the road-bed due to the large amount of overhang of the car-body, the principal support of which must be near the center of gravity, and the difficulty of securing a sufficient angle of tip on the car-body to free it completely from the load in dumping and at the same time discharge the load at a sufficient distance from the track. To overcome these difficulties and secure other advantages, which will hereinafter appear, I have designed and invented the car-dumping apparatus illustrated in the accompanying three sheets of drawings, in which—

Figure 1:
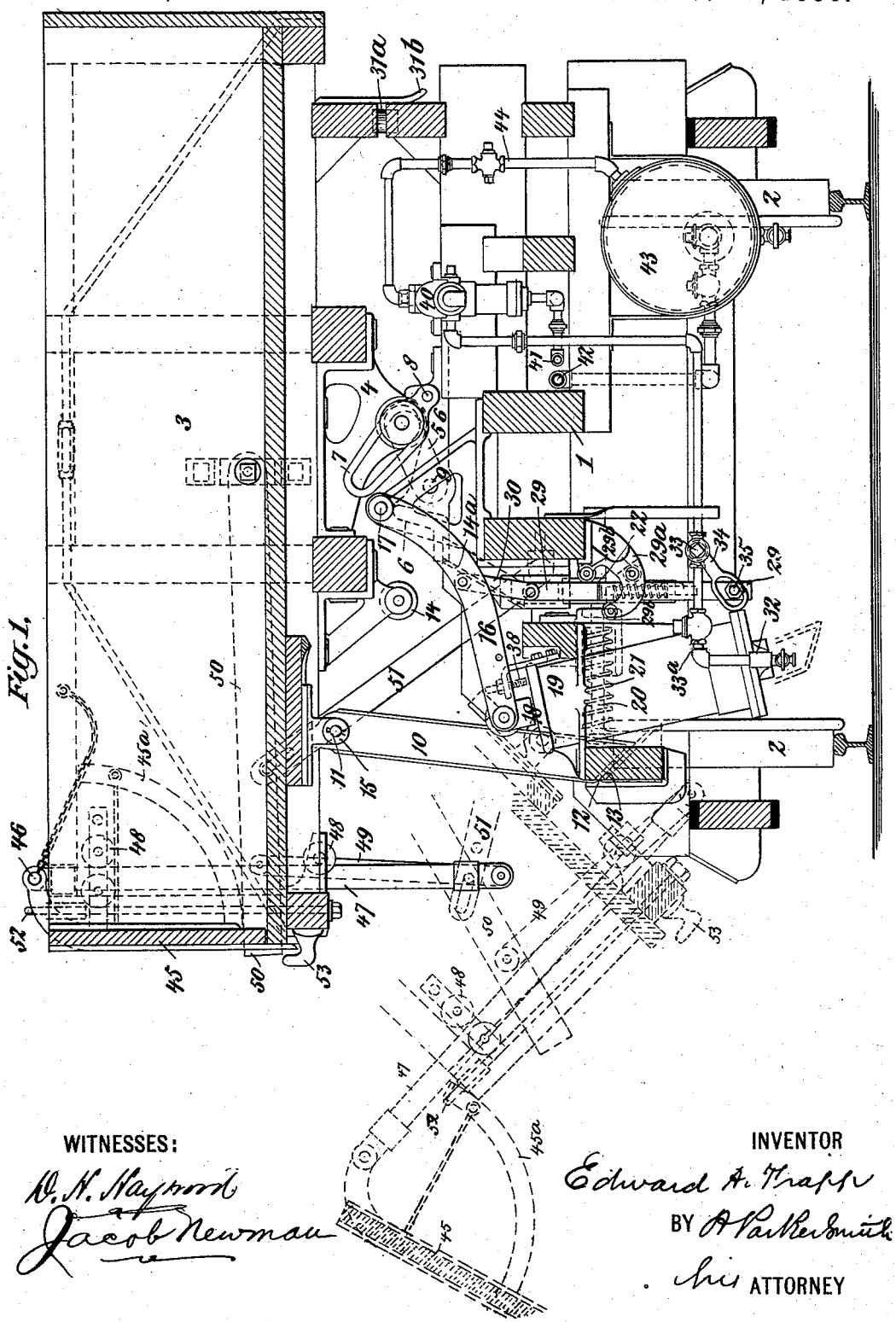
Figure 2:
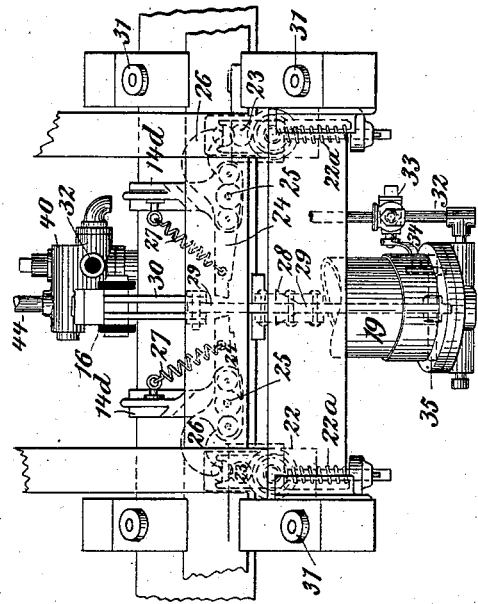
Figure 3:
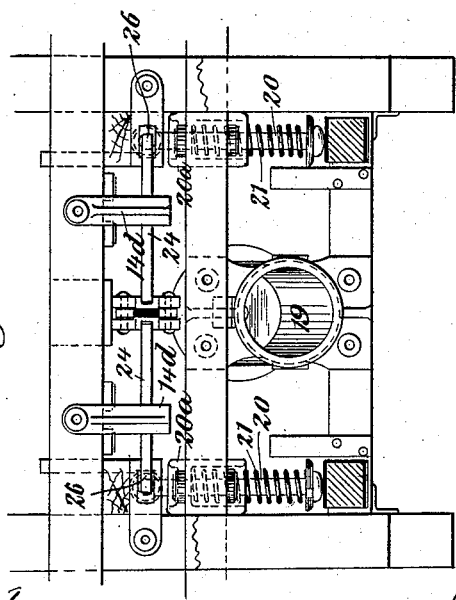

Figure 1 is a cross-section of the car, showing the apparatus assembled and partially indicating in dotted lines the position of the car body and door when dumped. Fig. 2 is a detail side view of the locking apparatus. Fig. 3 is a plan view of the same. Figs. 4 and 5 are details of the cylinder and piston. Fig. 6 is a detail view, partly in sections, showing the manner of pivoting the car-body to the truck-frame. Fig. 7 is a detail sectional view on line 7 7 of Fig. 6, and Fig. 8 is a similar view on line 8 8 of Fig. 6.

Throughout the drawings like reference-figures refer to like parts.

1 is the truck-frame, mounted on the wheels 2 and carrying the car-body 3. Bolted to the timbers of the car-body are one or more castings 4, which, by means of pivoted links 5, are connected to and supported from the recessed casting 6, mounted on the truck-frame. The link 5 is pivoted to the casting 6 at 9, and its motion is controlled and limited by the links 7 7, which are also pivoted to the casting 6 by the pin 8.

The pivotal point of support of the car-body is at the right hand of its center of gravity, (looking at Fig. 1.) The car-body is normally maintained in its horizontal position by one or more struts or removable supports 10, which are pivoted to the car-body, as shown at 11, and have their lower ends beveled, as shown at 12. These beveled lower ends fit into correspondingly-beveled sockets 13 in the truck-frame and when held there positively support the car-body 3.

When the car-body is tipped by the removal of the supports 10, the rollers 14 strike down upon the inclined surface $14^a$ on the truck-frame and the roller 15 bears upon the operating-lever 16, which is pivoted at 17 to a casting $16^a$ on the truck-frame, and also to the piston-rod 18, which is operated by the piston in the operating-cylinder 19.

The lower ends of the supports 10 are normally maintained in the sockets 13 by the action of the buffers 20, each of which is mounted in a guide $20^a$ and pressed outwardly by the spring 21, and is positively held in such extended position by the sliding plate 22. This sliding plate 22 in each case has an opening 23, which, when the plate is forced down against the tension of the spring $22^a$, will register with the end of the buffer 20, permit said buffer to pass through said opening, allow the supports 10 to slip out of the sockets 13, and dump the car-body. The mechanism by which such motion of the plate 22 is secured is illustrated in Figs. 2 and 3. 24 24 are levers pivoted at 25 25 to the castings $14^a$ on the truck-frame and having overhanging extremities 26 26, which bear upon the plates 22 22 by virtue of the tension of the springs 27 27, but not with sufficient pressure to overcome the springs 22ª 22ª. The inner ends of said levers 24 are caught by the lugs 28 on the sliding bar 29, which is connected to the operating-lever 16 by the link 30, when said operating-lever is forced up by the rising of the piston-rod 18.

31 31 are rubber buffers arranged on the sloping surfaces on the left-hand side of the truck-frame to receive the car-body when it has reached the end of its dumping motion. 31ª is a similar rubber buffer for checking the motion of the car-body after it has returned to horizontal position, and 31ᵇ is a guide for securing the proper seating of the car-body on said buffer.

32 is a pipe connection to the end of the cylinder 19, through which the compressed air, steam, or other fluid under pressure is admitted to drive up the piston 19ª and operate the tripping apparatus above described. The sliding piece 29 is guided between the rollers 29ᵇ, mounted in the casting 29ª on the truck-frame.

The system of valves by which the piston 19ª is caused to move in the cylinder 19 consists of the following: first, the throttle-valve 33 in the pipe connection 32, which by means of the bent and slotted crank 34 is operated by the pin 35, which is mounted in the lower end of the sliding plate 29; secondly, in the piston 19ª is an exhaust-valve 36, which has a long projecting stem 37, designed to operate in conjunction with the adjustable stop 38, so as to open said exhaust at a determinable point in the latter portion of the piston travel. 39 is a spring which closes the exhaust-valve when the piston has nearly reached the cylinder-head on its inward stroke. The compressed air, which is designed to be used with the special form of apparatus illustrated, is manipulated in the customary form of apparatus, of which 40 is any proper form of triple valve, 42 is the train-pipe supplying the reservoir 43, 44 is the supply-pipe from the reservoir to the triple valve, and 41 is the train-pipe in which the variations of pressure control the triple valve 40.

The door-operating apparatus for the car-body consists of the swinging door 45, hinged at 46 to the sliding posts 47, which move up and down between the rollers 48. These posts are connected with the car-body by the links 49 and the pivoted lever 50 and with the truck-frame by the slotted links 51. 52 is an elongated staple or guide for the curved arc-shaped guides 45ª, which project from the inner side of the door 45. 53 is a catch for the lower edge of the door 45.

The mode of operation of the different portions of my invention is as follows: When the loaded car is in its normal position, the mechanism is all as shown in full lines in Fig. 1. When the engineer wishes to dump the car, he introduces pressure into the pipe connection 32 by operating the triple valve 40 or otherwise. The throttle-valve 33 being open, the compressed air passes into the cylinder and lifts the piston and with it the operating-levers 16 and the sliding plate 29. As the plate 29 goes up the pin or bolt 35 gradually closes the valve 33 until, at some determinable point in the piston travel, (preferably about half-stroke,) the throttle is closed, and the rest of the piston stroke is made by the expansive force of the compressed air previously admitted to the cylinder. When the piston has nearly approached the upward limit of its stroke and the operating-lever 16 is nearly up against the roller 15, the lugs 28 lift the levers 24 of the tripping device and the projections 26 on these levers force down the locking-plates 22 until the buffers 20 are allowed to slip through the holes 23. This releases the supports 10 and the weight on them forces their beveled ends 12 to slide down out of the sockets 13. The weight of the car-body is thus brought, together with its load, upon the operating-lever 16. At or about the time the locking device has been tripped, as above described, the stem 37 of the exhaust-valve has struck the adjustable stop 38 and the contents of the cylinder have been exhausted into the air. The piston is consequently forced back by the tipping car-body, and the air discharging through the exhaust-valve acts as a cushion. When the piston has reached the midway point of the downward stroke, the throttle-valve 33 is opened by reverse action of the mechanism which closed it, and full reservoir-pressure is admitted under the piston to escape through the exhaust-valve and increase the cushioning action. The motion continues until the car-body is nearly in a position indicated in dotted line in Fig. 1. Before that point has been reached the downward motion of the lever 50 has been checked by the slotted lever 51, the sliding posts 47 have consequently been lifted relatively to the car-body, the door 45 released from the catch 53, and the contents of the car-body dumped. The load having been discharged and the motion of the car-body checked by the buffers 31 and the cushioning action, and the exhaust-valve 36 having been closed by the spring 39, the air trapped in the end of the cylinder by the closing of such valve and the closing of the check-valve 33ª begins to expand and force the piston up and return the car-body to its normal position. When the piston has moved a short distance and the entrapped air has expanded to the pressure existing in the reservoir 43, the check-valve 33ª in the pipe connection opens and air from the reservoir rushes in through the open throttle-valve 33 and the piston continues its upward travel. When the piston has reached half-stroke, the throttle closes and the rest of the stroke is made under the gathering momentum of the car-body and the expansive action of the air in the cylinder. As the car-body goes back the swinging door 45 falls back into its position, being guided by the arc-shaped pieces 45ª, and drops into the latch 53, locking it in position. When the car-body has regained horizontal position, the springs 21 force out the buffers 20, which drive the supports 10 into the sockets 13. The springs 22ª force the locking-plates 22 up again as soon as the buffers are withdrawn from the hole 23, and said plates lock the buffers and consequently the supports 10 in position to sustain the car-body. The lugs 28 have passed up beyond the point of engagement with the levers 24 just before the latter are snapped down by the rising of the plates 22. At the moment the car-body has been locked in its horizontal position the exhaust-valve 36 opens, as before, on striking stop 38, and the piston and operating-lever 16 fall back into the position shown in Fig. 1 by their own weight and the jolting action of the car. The lugs 28 snapped by the levers 24 during the downward motion of the sliding plate 29, the engineer has closed the triple valve 40 by raising the pressure in train-pipe 41, so that there is no air-pressure in the pipe connections 32, and everything is in readiness for a repetition of the operation upon the reopening of the triple valve.

If desirable, the engineer can close the valve at the moment the car is dumped and retain the car-body in the tipped position shown in dotted lines as long as may be desired. During the dumping the car-body turns first on the pivot of the casting 4, resting in the casting 6, as shown in Fig. 6. When the roller 14 comes to a bearing on the inclined surface 14ª, the car-body begins to turn and slide on said roller, and the link 5 turns upon its pivot 9, allowing the original fulcrum of the car-body to rise and describe an arc of which the link 5 is the radius and the link 7 is the chord. This gives the car-body a lateral motion and an unusually large angle of tip, which insures the complete discharge of the load and the depositing of it at a point well to one side of the track.

The advantages of this apparatus are in its cheapness, only a single-acting cylinder being required, the small consumption of power and consequently reduction of wear on the apparatus by reason of the fact that the empty car-body only has to be moved instead of the loaded car-body, the economy resulting from the using of the air expansively, and the stability given to the car-body by reason of its positive support over a large area of base by reason of the casting 4, the buffer 31ª, and the removable supports 10 being all in operation, sustaining the car-body at widely-separated and evenly-divided points of contact.

A further advantage of my invention as described and illustrated lies in the fact that the car-body is allowed to tip at such an acute angle that while any considerable portion of the load remains in it the weight will overpower any tendency of the compressed-air apparatus to prematurely return the car-body to its horizontal position, and consequently the complete discharge of all the material from the car-body is assured.

Having therefore described my invention, what I claim as new, and desire to protect by Letters Patent, is—

1. In a dumping-car the combination of the truck-frame, the car-body pivotally connected thereto so that it dumps by its own weight, a cylinder and piston mounted in said truck-frame and connections by which the piston returns the car-body to its normal position when said piston is forced up, together with pipe connections by which fluid under pressure is admitted to the cylinder beneath the piston, substantially as described.

2. In a dumping-car the combination of the truck-frame, the car-body pivotally connected thereto so that it dumps by its own weight, locking apparatus which normally supports said car-body in a horizontal position, a cylinder and piston mounted in said truck-frame and connections by which the piston trips said locking device on its first stroke and returns the car-body to its normal position on its second stroke in the same direction, together with pipe connections by which fluid under pressure is admitted to the cylinder beneath the piston, substantially as described.

3. In a dumping-car the combination of the truck-frame, the car-body pivotally connected thereto so that it dumps by its own weight, a cylinder and piston mounted in said truck-frame and connections by which the piston returns the car-body to its normal position when said piston is forced up, together with pipe connections by which fluid under pressure is admitted to the cylinder beneath the piston, a throttle-valve in said pipe which is automatically closed at a determinable point in the upward travel of the piston and an exhaust-valve for the cylinder which is automatically opened at the end of the piston's stroke, substantially as described.

4. In a car-dumping apparatus the combination of the cylinder, the piston, the exhaust-valve opening downward in said piston, and the overhanging stop at the upper end of the cylinder which opens said exhaust-valve at the end of the stroke, a swinging car-body which dumps by its own weight, and a connection from car-body to piston such that the piston, with exhaust-valve open, is forced down by the weight of the car-body and cushions its fall, substantially as described.

5. In a car-dumping apparatus the combination of the cylinder, the piston, the pipe connections which supply fluid under pressure to the cylinder beneath said piston, the throttle-valve in said connections, and mechanism operated by the piston to close said throttle at a given point in the upward travel of the piston and open the throttle again at approximately the same point in its downward travel, a swinging car-body and connections from the car-body to the piston, substantially as described.

6. In a car-dumping apparatus the combination of the cylinder, the piston, a swinging car-body and connections from the car-body to the piston, the pipe connections which supply fluid under pressure to the cylinder beneath said piston, the throttle-valve in said connections, the mechanism operated by the piston to close said throttle at a given point in the upward travel of the piston and open the throttle again at approximately the same point in its downward travel, together with an exhaust-valve opening downward in the piston, and the overhanging stop at the upper end of the cylinder which opens the exhaust-valve at the end of the piston-stroke, substantially as described.

7. In a car-dumping apparatus the combination of the truck-frame, the car-body pivotally connected thereto so as to dump by its own weight, one or more supports pivoted to said car-body on the dumping side, said supports having their lower ends beveled, sockets in the truck-frame for the lower ends of said supports beveled at a corresponding angle, and locking apparatus which normally retains said supports in said sockets but which may be manipulated to release said supports from said sockets and thereby dump the car, substantially as described.

8. In a car-dumping apparatus the combination of the truck-frame, the car-body pivotally connected thereto so as to dump by its own weight, one or more supports pivoted to said car-body on the dumping side, said supports having their lower ends beveled, sockets in the truck-frame for the lower ends of said supports beveled at a corresponding angle, and locking apparatus which normally retains said supports in said sockets but which may be manipulated to release said supports from said sockets and thereby dump the car, said locking apparatus consisting of one or more spring-buffers mounted in the truck-frame, which press said supports into their sockets, a sliding locking-plate behind each buffer, which plate has an opening therein that registers with the rear end of said buffer when the plate is slid into proper position, and mechanism operated by the dumping apparatus to slide said locking-plates into such position, substantially as described.

9. In a car-dumping apparatus the combination of the truck-frame, the cylinder mounted therein, the operating-lever pivoted thereto, the piston and piston-rod connected to said lever, the spring-pressed buffers, the sliding locking-plates for said buffers, the pipe connections to the cylinder and the throttle-valve therein, together with the connections from the operating-lever to the throttle-valve and to the locking-plates, whereby both are automatically controlled by said operating-lever, substantially as described.

10. In a dumping-car the combination of the truck-frame, the car-body pivoted thereto, the sliding posts in said car-body and the swinging door hinged to said posts, connections from the posts to the truck-frame whereby the posts are lifted relatively to the car-body and the swinging door released as the car-body descends, and the arc-shaped guides for the door which engage with the head-boards of the car-body and guide the door back into position when the car-body is lifted, substantially as described.

11. In a dumping-car the combination of the truck-frame, the car-body pivotally supported on such truck-frame, at a point to one side of its center of gravity when loaded, an elastic supporting-buffer on the same side adapted to both check the return movement of the car-body and assist in supporting it in a horizontal position, and the removable supports for the car-body located on the other side of its center of gravity, substantially as described.

12. In a dumping-car the combination of the truck-frame, the recessed casting thereon, the swinging car-body and the casting thereon which rests in the recess of said first-mentioned casting when the car-body is in its normal position, together with the link pivoted at opposite ends to said two castings, substantially as described.

13. In a dumping-car the combination of the truck-frame the recessed casting thereon, the swinging car-body and the casting thereon which rests in the recess of said first-mentioned casting, together with the link pivoted at opposite ends to said two castings, and the slotted link pivoted to the recessed casting and limiting the vibration of the first link, substantially as described.

14. In a car-dumping apparatus the combination of the truck-frame, the car-body pivotally connected thereto so as to dump by its own weight when loaded, one or more pivotal supports for said car-body located under its dumping side, and locking apparatus which normally retains said supports in operative position, but which may be manipulated to release said supports and thereby dump the car, together with a stationary supporting-buffer for the car-body under the side opposite to that under which the above-mentioned pivotal supports are located, adapted to both check the return movement of the car-body and assist in supporting it in a horizontal position, substantially as described.

In testimony whereof I affix my signature in presence of two witnesses.

EDWARD A. TRAPP.

Witnesses:
WARREN W. FOSTER,
A. PARKER SMITH.